United States Patent [19]

Munski

[11] 4,422,757

[45] Dec. 27, 1983

[54] APPARATUS AND METHOD FOR OPTICAL PHASING OF HELICOPTER MAIN ROTOR BLADES

[75] Inventor: Michael S. Munski, Carlsbad, Calif.

[73] Assignee: Hughes Helicopters, Inc., Culver City, Calif.

[21] Appl. No.: 292,699

[22] Filed: Aug. 13, 1981

[51] Int. Cl.³ ............................................. G01B 11/26
[52] U.S. Cl. ...................................... 356/138; 33/286
[58] Field of Search ........ 356/138, 140, 147, 152–153; 33/286, 288, 174 C; 73/455–456

[56] References Cited

U.S. PATENT DOCUMENTS

| 1,709,310 | 4/1929 | Dahl | 356/140 |
| 2,737,722 | 3/1956 | Keim | 33/286 |
| 4,319,406 | 3/1982 | Pehrson | 33/286 |

FOREIGN PATENT DOCUMENTS 372014  9/1920  Fed. Rep. of Germany ........ 33/286

OTHER PUBLICATIONS

Schneider, E. J., "Alignment Works Better with Telescope in First Bearing", American Machinist, 5–1956, p. 152.

*Primary Examiner*—William H. Punter

*Attorney, Agent, or Firm*—Beehler, Pavitt, Siegemund, Jagger & Martella

[57] ABSTRACT

The lead-lag angle or phasing of a rotor blade system for helicopter can be adjusted by using a method and apparatus which positions the blade tip at a spatial location and angular orientation approximating a no-lift, full centrifugal load condition. An optical means is used to form a line-of-sight from the blade tip to a first and second target. The first target is mounted on the lead-lag hinge pin and the second target is mounted on or near the rotor drive hub. Both the optical means and either one or both of the targets may be offset so that, when the optical means, first target and second target will lie along a linear line-of-sight, the designed lead-lag angle of the corresponding blade to which the apparatus is coupled, will be achieved. The apparatus comprises a frame member through or on which the blade tip slips and includes levels to ensure the proper spatial and angular orientation of the blade given the specific rotor blade system. The first and second targets may take various forms according to the rotor blade system and the nature of the optical sighting means. In general the first target has a portion which is adapted to be visually lined-up with a portion of the second target. A specified alignment of the first and second of targets is uniquely defined, readily observable, and easily distinguishable from a non aligned relation. When aligned the blade is in the designed lead-lag angle.

21 Claims, 10 Drawing Figures

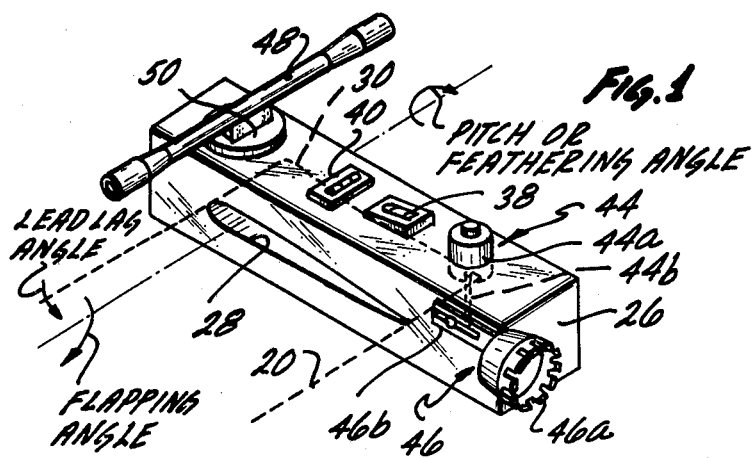
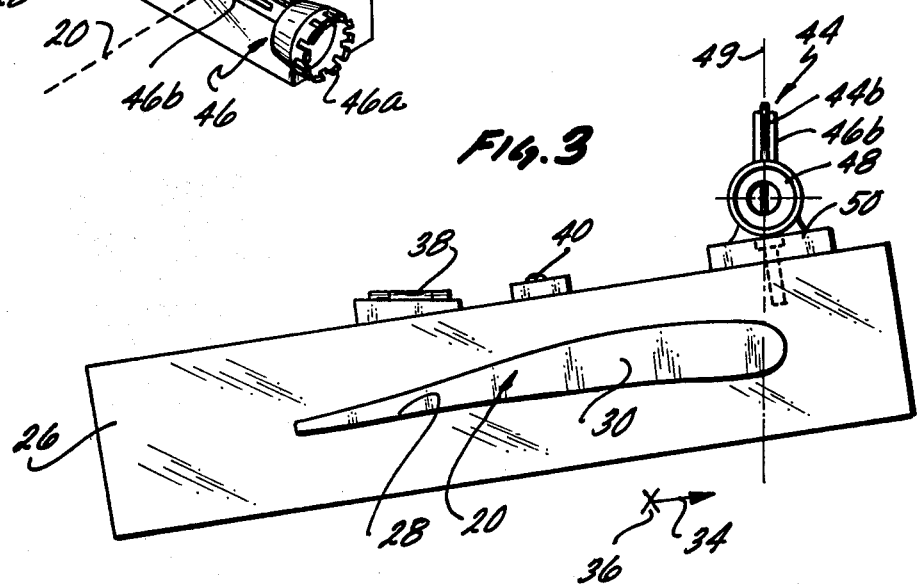
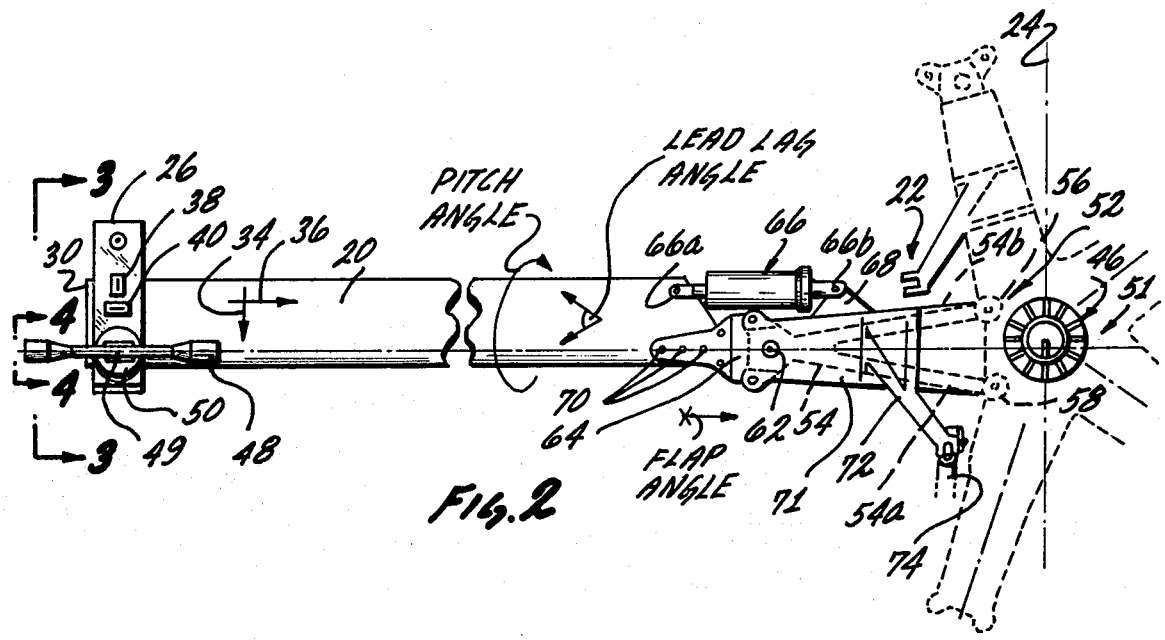

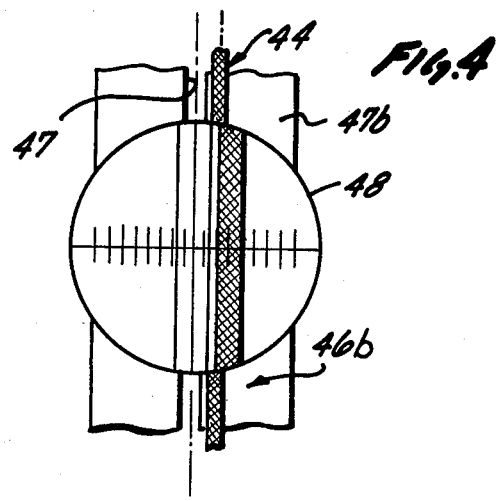
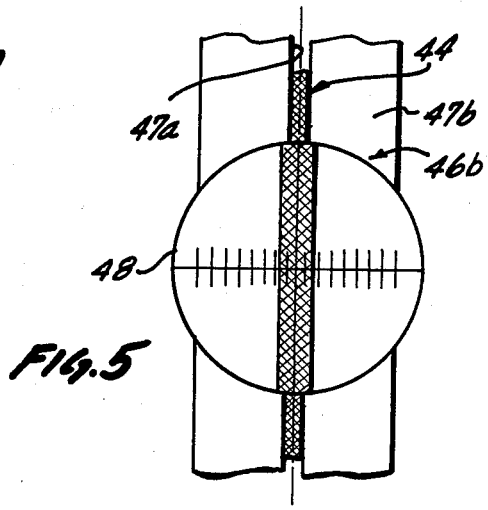
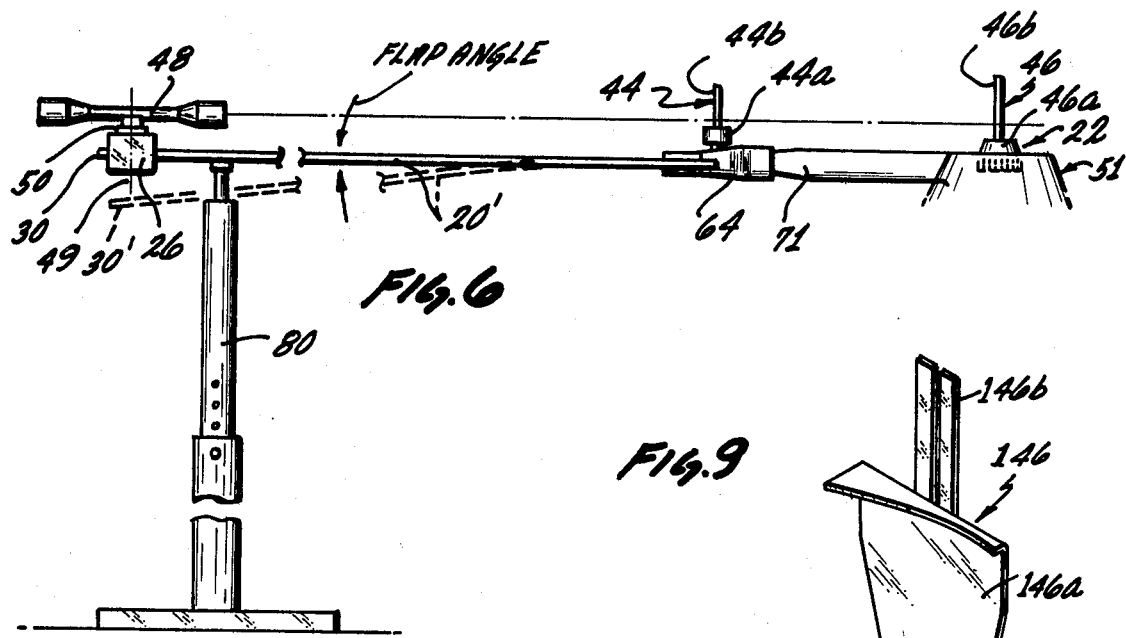
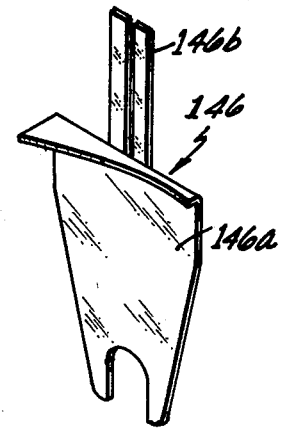
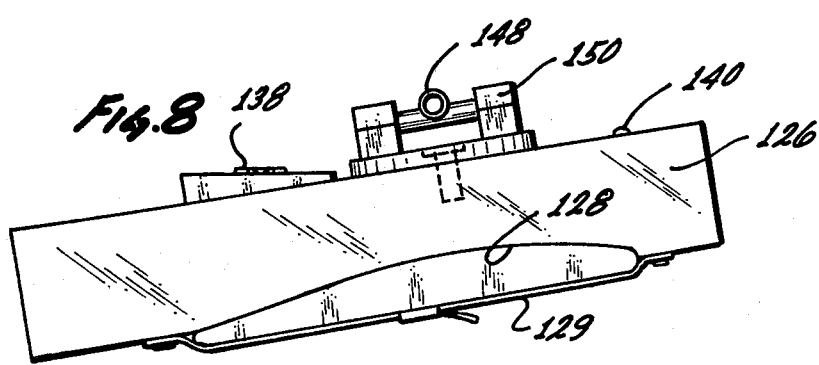

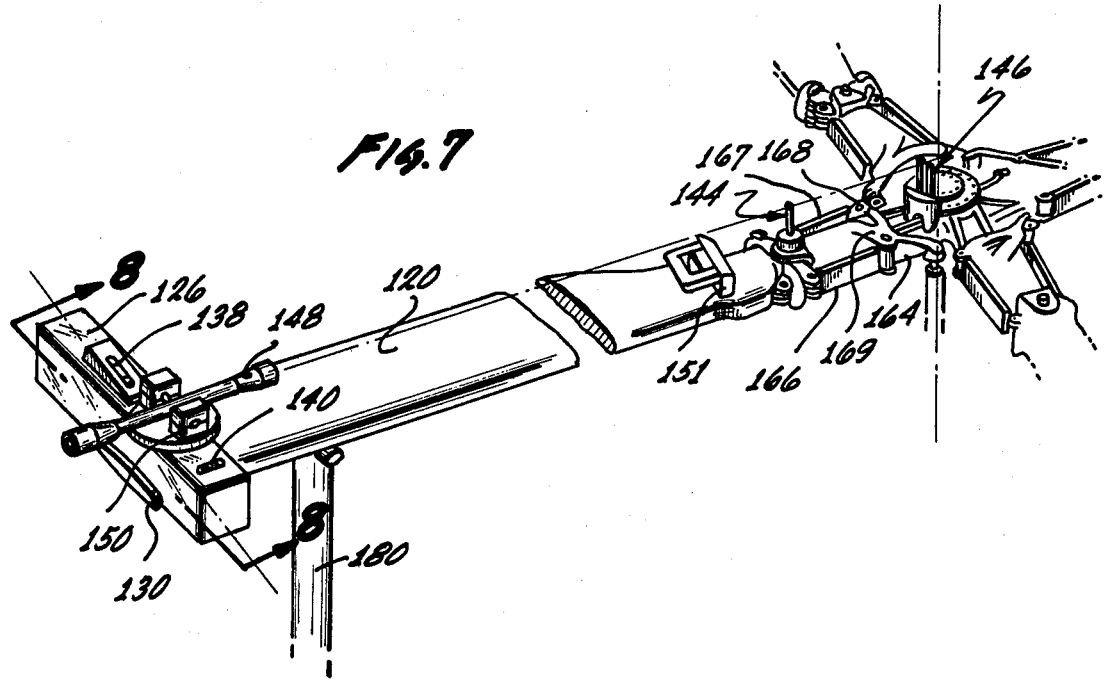
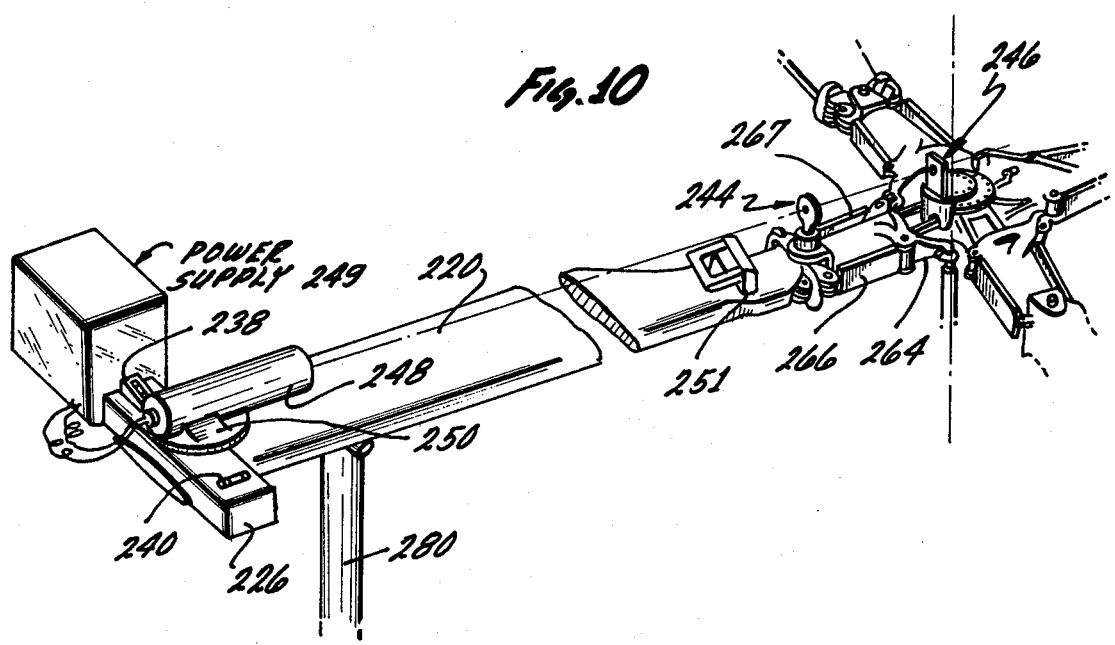

APPARATUS AND METHOD FOR OPTICAL PHASING OF HELICOPTER MAIN ROTOR BLADES

BACKGROUND OF THE INVENTION

1. Field of the Invention

The invention relates to the field of optical tools and methods for adjusting the lead-lag phasing of helicopter rotor blades.

2. Description of the Prior Art

A rotor system in a helicopter includes a rotor hub drive, a plurality of blades, and a support assembly to which the helicopter blades are attached by a suitable connecting means, such as a rotor blade strap pack which connects the blades to the rotor hub, which permits flapping of the blades as well as changes in pitch (feathering), and which permits changes in the lead-lag angle. Typical prior art helicopter rotor systems are comprised of multiple blades. Lead-lag adjustment means is provided for changing the degree by which the tip of a helicopter blade angularly deviates from the straight line which is perpendicular to the instantaneous direction of blade motion. Generally, the straight line representing a zero lead-lag adjustment is that line which includes the aerodynamic center of the blade tip; the hinge pin, which is near where the root of the blade is coupled to the strap pack; and the central point of the rotor hub. If any one of the blades should have a lead-lag adjustment different than others, a substantial stress occurs upon the rotor system and helicopter in general.

The prior art alignment methods for multiple blades included methods as simple as drawing a string under tension from the center of the rotor hub to the blade tip in order to compare the angle of the string made to the zero lead-lag line as evidenced by the displacement of the string from the hinge pin.

Other prior art methods include the use of a low power telescope mounted at the central point of the rotor hub to sight toward the blade tip and to measure the angular deviation between the blade tip and the hinge point.

However, both methods are subject to errors due to the flexibility of the helicopter blade. Thus, when such a test was statically made, the blade tip would droop toward the ground making the measurement difficult and in most instances the blade tip would droop to position which was either forward or behind the position the blade would assume during operation. In addition thereto, helicopter blades are designed to have an inherent twist along the length of the blade. When the blade droops in the static position, this twist will cause displacement of the blade tip from the position the blade will assume when it is straightened under centrifugally loaded operation. After the lead-lag angular adjustments had been "eye-balled" by a prior art method, the only means for testing the adjustment is to test fly the helicopter and measure the direction and magnitude of the remaining vibration. Such in-flight accelerometers, used to measure the direction and magnitude of the vibration, are well known to the art and heretofore have been relied upon as the principal means by which the lead-lag angles could be practically adjusted.

However, it is no longer convenient to practice the prior art methods for lead-lag adjustment inasmuch as modern helicopters often incorporate a substantial amount of equipment within or on the hub, such as radar equipment, air-speed data measuring devices and deicing equipment, all of which make the use of hub-mounted transits virtually impossible. The alignment of rotor blades during military operations is further aggravated in that alignment at night by these prior art methods is extremely difficult and haphazard due to the lack of necessary lighting to accurately practice the prior art methodology.

What is needed then is a method and apparatus for optically phasing the rotor blades which will overcome each of the limitations and disadvantages of the prior art methods and apparatus. A means must be devised which provides optical blade phasing in helicopters which is easy to install and to set up, and which avoids conflict with hub mounted devices such as air-speed indicators, radar installations and deicing equipment.

BRIEF SUMMARY OF THE INVENTION

The present invention is an apparatus for adjusting lead-lag angles of the helicopter rotor system, which system has a rotor hub, and a plurality of rotor blades and wherein each rotor blade has a hinge pin. The apparatus comprises a fitted frame member which slip fits over the tip of the rotor blade. A frame alignment means for spacially positioning the tip of the rotor blade with respect to the rotor hub is coupled to the frame member. A first target is arranged and configured to be disposed on the hinge pin. A second target is arranged and configured to be disposed on the rotor hub. An alignment means is coupled to the frame member and is employed for aligning the tip of the rotor blade, the first target and the second target along a predetermined line or in a predetermined relationship. By virtue of this apparatus, appropriate lead-lag angles of a rotor blade may be quickly and accurately achieved with a static test.

The present invention also includes a method for statically adjusting the lead-lag angles of helicopter rotor system comprising the steps of disposing a first target in association with the hinge pin of a rotor blade of the helicopter rotor system. A second target is disposed in association with the center of a rotor hub for each rotor blade. An optical alignment means is disposed on a rotor blade tip corresponding to the hinge point. A rotor blade tip is disposed or positioned in a predetermined spatial location in part by use of a spanwise level indicator. The pitch angle of the blade tip is adjusted to a predetermined angle in part by use of a chordwise level indicator. An optical line-of-sight is formed between the optical alignment means through the first target to the second target. The blade lead-lag angle is then adjusted based on the line-of-sight by selective displacement of the first and second targets. By this combination of steps the lead-lag angles of each blade of a helicopter rotor system may be statically adjusted with a high degree of accuracy, and the adjustment may be made from the blade tip without interfering with rotor hub equipment or fixtures.

The present invention and its various embodiments can be better understood by reviewing the detailed description of the preferred embodiments in light of the following figures wherein like elements are referenced by like numberals.

BRIEF DESCRIPTION OF THE DRAWINGS

FIG. 1 is a perspective view of a rotor phasing tool using optical alignment devices according to the present invention. The optical alignment means and level indicators for the frame member are predominantly illustrated.

FIG. 2 is a plan view of a helicopter rotor blade coupled through a strap pack assembly to a rotor hub. The apparatus of the present invention is shown as mounted to the blade tip, with the first and second targets mounted at the hinge point and rotor hub respectively.

FIG. 3 is an end view taken through section 3—3 of FIG. 2 showing the attachment of the frame member to the blade tip.

FIG. 4 is a diagramatically enlarged view taken through the optical alignment means showing the relative displacement of the first and second targets.

FIG. 5 is the view of FIG. 4 showing an alignment of the first and second targets.

FIG. 6 is a side view of the blade shown in FIG. 2 illustrating the spacial alignment of the blade tip at a predetermined position and more clearly illustrating the position of the first and second targets.

FIG. 7 is a perspective view of a second embodiment mounted on a different type of helicopter blade.

FIG. 8 is an end view of the frame member of the embodiment illustrated in FIG. 7.

FIG. 9 is the rear view of the rotor hub or second target as illustrated in FIG. 7.

FIG. 10 is a third embodiment of the present invention wherein a laser beam is used as the optical alignment means in combination with appropriately modified first and second targets.

DETAILED DESCRIPTION OF THE PREFERRED EMBODIMENTS

The present invention is an optical phasing alignment apparatus and method, which apparatus comprises a frame member having a template portion adapted to fit chordwise or perpendicularly over the tip end of a rotor blade. The frame member has mounted thereon a chordwise level to measure the level along a direction perpendicular to the axis of the rotor blade, and a spanwise level to measure the level along the axis of a rotor blade. A pair of first and second targets are mounted and attached to the blade hinge pin and rotor drive hub respectively. In one embodiment, the hinge pin target is a straight, vertical wire extending from a mounting registered to the hinge pin of the rotor blade. The rotor hub in this case is a slotted member having a mounting which registers to the rotor hub. The slot in the second target is vertically disposed so that when the second target on the rotor hub is disposed behind the first target on the hinge pin, the straight wire of the first target is aligned with the vertical slot of the second target according to the method of the present invention. The rotor hub or second target is offset from the straight line which connects the blade tip, hinge pin and center of the rotor hub by a designed amount according to the specific helicopter design in order to obtain the desired lead-lag angle of the rotor blade. An optical element, such as transit scope, is mounted on the frame member in an offset position which, when the blade tip is properly positioned, allows the formation of a line-of-sight from the optical element through the first target to the second target.

The method of the present invention can be generally understood by the following. The frame member is fitted to the blade tip, the first target is fitted to the hinge pin point, and the rotor hub target or second target is fitted to the rotor hub. The blade tip is disposed in that spatial position which the blade tip will assume during dynamic operation at a no-lift, full centrifugal load condition. By a "no-lift, full centrifugal load" condition it is meant that the blade tip is disposed in that position which it will assume during full rotary operation wherein the blade is feathered or assumes a pitch angle which will not exert any lift upon the helicopter. The blade tip is supported by an external means or stanchion at such an attitude that the spanwise level is centered. The blade tip is then positioned such that the cordwise level is centered, taking into account the design twist of the blade, to set the zero, no-lift or neutral angle of attack of the blade. Once the blade tip is positioned with the spanwise and cordwise levels centered, the lead-lag angle is adjusted about the hinge pin to bring the targets into alignment with the scope. It should be remembered that the hub or second target is offset according to the present invention such that the line which includes the blade tip, hinge pin and hub target is angularly displaced by the correct lead-lag amount from the straight line which would include the blade tip, hinge pin and center of the hub. The lead-lag angle is typically adjusted by lengthening or shortening the damper arm of the lead-lag control link coupled to the blade to allow the blade to rotate about the hinge pin as a pivot. When the proper length of the arm or link is adjusted, it is then set with the specified torques. The next blade is rotated into the same position and the process is repeated until the entire blade assembly has been statically adjusted.

These and other features of the invention, both as to its organization and method of operation will be better understood from the following detailed description in view of the accompanying drawings in which the preferred embodiments of the invention are illustrated.

A first embodiment in the invention is illustrated in FIGS. 1–6, a second is illustrated in FIGS. 7–9 and a third embodiment is illustrated in FIG. 10.

FIG. 1 shows the first embodiment of the invention wherein the apparatus is coupled to a five bladed rotor system as illustrated in FIG. 2. FIG. 1 shows frame member 26 coupled to blade 20. Blade 20 is adjusted when rotated to an angular position perpendicular to fore-and-aft line 24 of the helicopter shown in FIG. 2. The lead-lag angle of blade 20 is the angle which blade axis 36 makes with respect to the straight line through the aerodynamic center of blade tip 30, hinge pin 62 and the center of rotor hub 51. The pitch angle as illustrated in FIG. 2 is the angle through which blade 20 is rotated about blade axis 36.

Frame member 26 is shown in detail in FIG. 1 and includes a blade tip opening 28. A portion of blade tip 30 is disposed within opening 28 to permit an approximate orientation of frame member 26 with respect to blade 30 and hub 51. Opening 28 is shaped to closely fit over blade tip end 30 and is supported thereby in a generally repeatable chord or pitch angle orientation with respect to blade 20. The longitudinal or long axis of frame member 26 is positioned to be approximately parallel to spanwise axis 34 and perpendicular to blade axis 36.

Fine adjustments are made with respect to frame member 26 and blade 20 by use of bubble levels 38 and 40. Consider first chordwise bubble level 38. Level 38 is mounted on frame 26 on a wedge of such an inclination that the attitude assumed by blade 20 under a no-lift full centrifugal load condition will be measured as a centered or level condition by level 38 notwithstanding the designed pitch or twist in blade 20.

Similarly, spanwise level 40 is mounted on frame 26 on a similar wedge such that level 40 will be centered or measure a level condition when blade 20 is spatially oriented such that blade tip 30 assumes the position it will in fact take during the no-lift, full centrifugal load condition. Typically, this condition is that in which blade 20 will assume a horizontal or perpendicular extension from the axis of rotation of rotor hub 51. Therefore, the wedge disposed underneath level 40 is generally a plano-parallel rectanguloid. However, the present invention includes within its scope the possibility that other angular assumptions could be achieved by blade 20 and that level 40 could be biased by an appropriate wedge.

A first or hinge pin target 44 is mounted on hinge pin 62 as shown in plan view in FIG. 2 and as more clearly shown in side view in FIG. 6. Hinge pin target 44 is comprised of a base portion 44a which is particularly adapted to snugly fit over hinge pin 62 about which blade 20 rotates and an upper portion 44b which is comprised of a vertical, straight wire illustrated in FIG. 6 and better illustrated in enlarged partial view in FIGS. 4 and 5.

The second or rotor hub target 46 is illustrated in plan view in FIG. 2, is more clearly shown in side view in FIG. 6, and is similarly comprised of a lower portion 46a arranged and configured to snugly fit over or in rotor hub 51 and an upper portion 46b, which in the embodiment in FIGS. 1–6 is a flat plate having a vertical slot 47 defined therein. Slot 47 is more clearly illustrated in FIGS. 4 and 5.

FIG. 1 also illustrates the storage capability of frame member 26 wherein targets 44 and 46 are conveniently disposed within frame member 26 when not in use. For example, target 44 as shown in FIG. 1 as being inverted and inserted into a mating hole provided in frame member 26 leaving lower portion 44a exposed at the top of frame member 26 while rod or upper portion 44b is disposed and protected within frame member 26. Similarly, target 46 is disposed within a mating cavity within frame 26 such that the relatively delicate upper portion 46b of target 46 is retained within a protective enclosure of frame member 26 while lower portion 46a just extends from the end thereof. Thus, the entire adjustment element is conveniently maintained in an integral unit as shown in FIG. 1 in such a manner that damage and loss of its various component parts is avoided.

FIGS. 1–6 illustrate a sighting or telescopic scope 48 and its operation. Scope 48 forms an integral part of the optical alignment means of the present invention. In FIG. 1, scope 48 is mounted on top of frame 26 and is rotatably coupled to a turret 50. As illustrated in FIGS. 2 and 6, scope 48 is free to rotate about a vertical axis 49. It is also included within the scope of the present invention that scope 48 may be rotatable about a transverse axis through turret 50 by means of a bearing shown in FIG. 7. Scope 48 is disposed on the top surface of frame member 26 at a location to take into account the position of hinge pin 62 and rotor hub 51 together with the offset of target 46 attached thereto in order to obtain the designed, lead-lag angle for blade 20. Thus, in one embodiment of the present invention, as illustrated in FIGS. 4 and 5, it is possible that a linear alignment of upper portion 44b and slot 47 as sighted through scope 48 and as seen in FIGS. 4 and 5, does in fact result in the desired lead-lag angle of blade 20.

The location of scope 48 on frame 26 is best shown in end view in FIG. 3 wherein it is illustrated that vertical axis 49 is not necessarily perpendicular to the body axis of frame 26, and wherein it is illustrated that scope 48 will form a line-of-sight which includes upper portions 44b and 46b when blade tip 30 is spatially located at the proper position and angle. Bubble levels 38 and 40 are used, as indicated above, to achieve the proper spatial location and orientation of blade tip 30.

The method of using the present invention and the coaction of each of the elements of the apparatus can better be understood by first considering the angles of blade 20 which must be adjusted in order to obtain vibration-free, in-flight operation of a helicopter. During operation each blade 20 will be characterized by three angles: a spanwise flapping angle; a chordwise feathering angle; and a lead-lag angle. The spanwise angle is the angle between blade axis 36, shown in FIG. 2, and the earth's horizon. The spanwise angle is determined by the centrifugal loading and pitch loading on blade 20. Centrifugal loading is the outward force exerted on blade 20 by virtue of its mass and rotation. The centrifugal force tends to make the blade extremely rigid and cause blade 20 to assume a roughly horizontal attitude during level flight. Lift forces created by the change of pitch angle, which is controlled by mechanism denoted at the "collective," causes the blade to assume a spanwise angle within a range of angles called the coning angle in which the centrifugal load forces are balanced with the lift created by the blades. Variation of the spanwise angle is generally referred to as "flapping" and is more directly related to the characteristics of the strap pack and the nature of the connection between blade 20 and hub 51, which considerations are not of primary importance here.

The chord or pitching angle is the angle through which blade 20 is turned from the no-lift condition to a lift condition. The pitch angle is adjusted as shown in FIG. 2 by means of a pitch control link 74 coupled to pitch control arm 72 which in turn is coupled to pitch housing 71 that controls the overall incidence of blade 20. As noted above, as a practical matter, blade 20 incorporates a designed twist along its length which is not strictly considered pitch angle. Pitch angle as herein defined is the change of pitch of the blade from the no-lift condition to an adjusted position which creates lift.

Finally, the lead-lag angle is the azimuthal angle measured in the plane of FIG. 2 between blade axis 36 and the straight line between the center of the blade root and the center of hub 51. The lead-lag angle is adjusted and controlled by lead-lag control arm 66 which is coupled between pitch housing bracket 68 at attachment point 66b and at the rotor end of blade 20 at attachment point 66a. Control arm 66 forms an extendable link which allows blade 22 to rotate about hinge pin 62. Hinge pin 62 is coupled to the root end of blade 20 through a lead-lag link 64 which opens to receive the inner end of blade 20 and is fixed thereto by a plurality of bolts 70. Lead-lag link 64 is then coupled through strap pack 54 comprised of arms 54a and 54b to a polygonal ring 52 at attachment points 56 and 58. Polygonal ring 52 is coupled to rotor hub 51.

The method of the present invention is thus practiced as follows. Frame opening 28 is passed over blade tip 30. The exact amount by which blade tip 30 extends through frame member 26 is immaterial. Hinge pin target 44 is removed from its storage location within frame 26 and placed over hinge pin bolt head or nut 62 to which it is registered by virtue of a suitable recess made in lower portion 44a of first target or hinge pin target 44. Similarly, the second or hub target 46 is removed from frame 26 and mounted on rotor hub 51. Second target 46 is circumferentially splined as illustrated in perspective view in FIG. 1 to register in a predetermined position on hub 51 as shown in plan view in FIG. 2.

Blade tip 30 is moved into a position with respect to the helicopter on that side of the helicopter in which blade 30 will be advancing under normal rotation. Blade 30, however, is in a static condition. As shown in FIG. 6, blade 20 and blade tip 30 will droop to a position indicated by reference numerals 20' and 30' respectively. Blade tip 30 is then supported in a predetermined spatial position by a suitable external means, such as a jack stand or stanchion having a screw member 72 for fine adjustment. Blade 20 is brought into a level spanwise angle or at least within a range spanwise angles between the neutral or no-load condition and the maximum angle within the coning angle range. Next, the collective control of the helicopter is adjused to bring the pitch angle of blade 20 to the neutral or zero-lift condition. Both the desired spanwise and pitch angle are obtained by reference to chordwise level 38 and spanwise level 40 mounted on frame member 26. In other words, screw adjustment 72 is varied until spanwise level 40 indicates a centered position. Similarly, the collective pitch control of the helicopter is varied until chordwise level 38 indicates a centered position. The wedge under chordwise level 38 automatically adjusts to the designed twist within blade 20 and other design factors which must be accounted for.

At this point in the adjustment, scope 48 will be aligned according to the present invention to have targets 44 and 46 within the field of view as shown in FIG. 4. However, as shown in FIG. 4 it is not anticipated that the lead-lag angle of blade 20 will necessarily be properly adjusted. Improper adjustment will be shown as a displacement between member 44b of first target 44 and slot 47 of upper portion 46b of the second target 46. Any tilt in the system can be accommodated by slight rotation of the reticule of scope 48 if targets 44 and 46 are tilted due to an overall tilt of the helicopter. It is one of the advantages of the present invention that the helicopter as a whole need not be levelled in order for the apparatus and method of the present invention to effectively operate. Lead-lag control arm 66 is then appropriately adjusted to bring targets 46 and 44 into alignment as shown in FIG. 5. Lead-lag hinge pin 62 and control arm 66 and all other adjustment means are then tightened and fixed in order to retain the desired lead-lag angle.

Exceptional results have been found by using the alignment system of the present invention. Even in cases where the manufacturing tolerances are high, the helicopter will be found to be capable of being flown after the static adjustment with a minimum of vibration and, in practice, such vibration as may remain is tolerable for all practical purposes. However, if for special applications, additional vibration should be reduced, shaft balancing techniques, as are well known to the prior art, may be employed after the static test of the present invention by using a vector acceleration system based upon an accelerometer mounted in the helicopter. The direction and magnitude of the remaining vibration is measured by a Chadwick-Helmuth device as manufactured by the Chadwick-Helmuth Company, Inc. of 11 Rail Road Avenue, Monrovia, Calif.

Instead of weighting the blade tips as is normally the case in association with a Chadwick-Helmuth device to achieve fine balance, the present invention can be utilized. Blades 20 of the rotor system can be brought together toward or away from the indicated azimuthal angle as indicated by the vector and degree of imbalance measured by the Chadwick-Helmuth device. Such fine adjustment of rotor blades 20 is accomplished by using the present invention by displacing certain ones of the blades a selected number of target rod 44b diameters from the centered position with respect to slotted target 46b. Although calibrated in arbitrary units, and practiced to an extent in an experential manner, once the scale of adjustment is determined for a given helicopter, the calibration can be recorded and is easily repeated and controlled.

In order to facilitate the counting of the number of rod diameters by which stem 44b is displaced from the centered position of slot 47, rear target 46b is made of material which is less reflective than stem 44b. Therefore, blackened rod 44b stands out in the sharp contrast to the grey field provided by target 46b and bright slot 47. These light contrasts can be easily read within low power scope 48 which may also have its reticule calibrated in units of rod diameters 44b.

FIGS. 7-9 represent yet another embodiment of the present invention. For example, the apparatus of the present invention is shown in FIG. 7 as being used to align a four blade helicopter rotor system. Each of the elements in FIG. 7 are indicated by a reference numeral corresponding to its like element in FIGS. 1-6, except that the reference numeral has been increased by the addition of 100. For example, frame 26 in FIGS. 1-6 is indicated in FIG. 7 as frame 126. Rather than having an enclosed opening as is the case with opening 28 of frame 26, frame 126 has an indentation 128 shown in FIG. 8 which is formed to adapt to the upper surface of blade tip 130. Frame 126 is secured to blade tip 130 by means of a flexible tensioned strap 129 coupled at each end to frame 126 and secured underneath blade tip 130.

The operation of the present invention with a blade of the type shown in FIG. 7 is essentially the same as described in connection with FIGS. 1-6. However, it should be noted that the four bladed rotor system of FIG. 7 has lead-lag dampers 166 and 167 coupled to the root of blade 120. Lead-lag dampers 166 and 167 are mounted on opposite sides of the pitch housing and are each connected between lead-lag link 164 and a corresponding one of pitch housing brackets 168 and 169. The base of targets 144 and 146 are also modified to fit or register to the appropriate points of the four bladed rotor system. First target 144 is arranged and configured to register with hinge pin 162 (not visible in FIG. 7) while second target 146 is notched to fit over one of the corresponding feathering bearings of the four blade rotor system. The rear surface of the target 146 is shaped to conform to rotor hub 151 drive plate hub radius. The configuration of second target 146 is best shown in FIG. 9 wherein an upper slotted portion 146b is coupled to the specially adapted lower portion 146a. A cursory comparison of portion 146a of target 146 as shown in FIG. 9 with lower portion 46a of target 46 as shown in FIG. 1 emphasizes the alterations and modifications which may be incorporated within the present invention without departing form the scope of the present invention in order to adapt one or more elements to distinct rotor system types.

FIG. 10 shows yet another embodiment of the present invention, again wherein like elements are indicated by analogous reference numerals except that 200 is added to each numeral. For example, frame 26 of the embodiment in FIGS. 1-6, and frame 126 in the embodiments of FIGS. 7-9, find their corresponding analog in embodiment of FIG. 10 as frame member 226. The embodiment of FIG. 10 is implemented with a laser beam, projection system. Scope 48 of the first embodiment is replaced by a conventional, low power helium neon laser 248 mounted on turret 250 in the same manner as scope 48 and powered by a conventional power unit 238.

Targets 244 and 246 are also modified. First target 244 is arranged and configured to form a shield having a target hole at a central position. Second target 246 is arranged and configured to form a reflector wherein a central or bull's-eye portion is provided with a highly reflective surface surrounded by a contiguous surface of substantially less reflectivity. Thus, as lead-lag dampers 267 and 266 are adjusted, a beam of laser light from laser 248 will penetrate through the target hole of target 244 and impinge on target 246. However, the light reflected from target 246 will be dim until the laser beam impinges upon the highly reflective central portion, at which point, a bright spot suddenly appears on target 246.

It is also possible to provide a transluscent target 246 incorporating a light detector target. A conventional detector is utilized and provides an electronic readout signal indicative of when the beam is centered upon target 246. It is expected that the embodiment of FIG. 10 will be particularly useful in military applications where night-time adjustments must be made.

The features of the invention are illustratively disclosed above to provide specific examples as to its organization and methods of operation. However, it should be understood that these preferred embodiments are not intended to limit the scope of the invention which should be solely interpreted by reference to the following claims. Many modifications and alterations may be made to the illustrated embodiments by those having ordinary skill in the art without departing from the spirit and scope of the claimed invention. For example, while an optical telescope and laser beam has been disclosed in the preferred embodiments, it is also possible to implement the present invention by using a conventional rifle sight in place of these elements, such as a peep hole to define the optical axis in conjunction with the targets. In this case, lateral and vertical angular adjustments provided by turrets 50, 150 or 250 could be dispensed with, since the use of a rifle sight does not have the same inherent requirements for angular alignment as does a sighting telescope or laser beam.

What is claimed is:

1. An apparatus for adjusting lead-lag angles of a plurality of blades of a helicopter rotor system having a rotor blade, hinge pin and rotor hub comprising:
a fitted frame member coupled to the tip of said rotor blade;
frame alignment means coupled to said frame member for spatially positioning said tip of said blade with respect to said rotor hub in a predetermined relation;
a first target arranged and configured to be disposed on said hinge pin;
a second target arranged and configured to be disposed on said rotor hub; and
optical alignment means coupled to said frame for aligning said tip of said rotor blade, said first target and said second target along a predetermined line,
whereby appropriate lead-lag angles of said rotor blade may be quickly and accurately achieved by a static test.

2. The apparatus of claim 1 wherein said frame alignment means positions said blade tip at a static position assumed by said blade tip in dynamic operation when in a no-lift, full centrifugal load condition.

3. The apparatus of claim 2 wherein said frame alignment means includes an adjustable stanchion for supporting said blade tip at said predetermined positions, and a spanwise and a cordwise level and corresponding wedges for spatially and angularly orienting said blade tip in said predetermined relation, said levels being coupled to said frame member through said corresponding wedges to compensate for designed twist and shape of each said blade.

4. The apparatus of claim 1 wherein:
said first target includes a lower portion adapted to register with said hinge pin and an upper portion including a vertical pointer; and
said second target includes a lower portion adapted to register with said rotor hub and an upper portion including a flat plate having at least two areas of highly contrasting optical reflectivity.

5. The apparatus of claim 4 wherein said upper portion of said second target includes a vertical slot and a field on said flat plate of contrasting optical reflectivity to that of said pointer.

6. The apparatus of claim 4 wherein said optical alignment means is a telescope having a graduated reticule.

7. The apparatus of claim 6 wherein said reticule is calibrated in units of width of said pointer.

8. The apparatus of claim 4 wherein said upper portion of said second target is offset from the center of said rotor hub, and wherein the center of said upper portiion of said second target lies on a straight line defined by said pointer and said optical alignment means when said lead-lag angle is correctly adjusted.

9. The apparatus of claim 1 wherein said blade tip snugly fits through said frame member.

10. The apparatus of claim 1 wherein said frame member is adapted to register on the top surface of said blade tip.

11. The apparatus of claim 1 wherein:
said optical alignment means is a laser;
said first target includes a flat upper portion to define a target aperture; and spot.

12. An optical phasing tool to adjust the lead-lag angle of helicopter rotor blades in a static test, wherein each blade is characterized by a blade tip, hinge pin, and rotor hub, comprising:
a frame member arranged and configured to register on said blade tip;
a plurality of leveling means coupled to said frame member to indicate disposition of said blade tip at a predetermined position;
a first target arranged and configured to register on said hinge pin, said first target having a readily identifiable upper portion;
a second target arranged and configured to register on said rotor hub, and having an upper portion readily distinguishable from said upper portion of said first target; said second target being registered by an offset from the center of said rotor hub; and a telescopic sight coupled to said frame member at a point thereon such that when said blade tip is disposed in said predetermined position corresponding to a no-lift, full centrifugal load position of said blade tip, said first and second targets will lie along a line-of-sight through said telescope when said blade tip has a predetermined value of said lead-lag angle, whereby said lead-lag angle may be statically adjusted with accuracy from said blade tip inward.

13. A method for statically adjusting the lead-lag angles of a helicopter rotor system comprising the steps of:

disposing a first target in association with a rotor blade hinge, disposing a second target in association with the axis of a rotor hub, and disposing an optical alignment means on a corresponding rotor blade tip;

disposing said rotor blade tip to a predetermined spatial position in part by means of a spanwise level indicator;

adjusting the pitch angle orientation of said blade tip to a predetermined angle in part by means of a chordwise level indicator;

forming an optical line-of-sight from said optical alignment means through said second target to said first target; and adjusting blade lead-lag angle based on said line-of-sight by selected displacement between said first and second targets, whereby lead-lag angles of helicopter blades may be statically adjusted to a high degree of accuracy from said blade tip.

14. The method of claim 13 further comprising the steps of:

dynamically measuring the magnitude and vector direction of vibration of said helicopter rotor system while in flight; and statically adjusting lead-lag angles of each blade of said rotor system by amounts as suggested by said measurement of magnitude and vector direction of vibration and as measured by said first and second targets and optical alignment means to reduce said vibration.

15. The method of claim 14 further including the step of recording said adjusted amounts for each said rotor system whereby fine adjustment may be achieved in a repeatable fashion for said rotor system solely by static adjustment.

16. The method of claim 14 or 15 where said adjusted amounts are measured in units associated with said first target.

17. The method of claim 16 wherein said first target has an upper portion defining a pointer or uniform width.

18. The method of claim 17 wherein said optical alignment means has a graduated reticule in units of said pointer.

19. The method of claim 18 wherein said pointer is a vertical rod and said second target has a corresponding vertical slot and a field portion defining said slot and having contrasting relectivity to said pointer.

20. The method of claim 19 wherein said pointer is a target aperture and said second target has a highly reflective central target spot, said optical alignment means generating a narrow beam of light impinging on said first and second targets.

21. A method for adjusting the lead-lag angle of a helicopter rotor blade comprising the steps of:

statically positioning the blade tip of said rotor blade at a no-lift, full centrifugal load position as assumed by said blade tip during rotation;

registering a first target at a hinge pin of said blade;

registering a second target offset by a predetermined amount from the center of a rotor hub coupled to said blade;

forming a line-of-sight through a telescope mounted at a selected position on said blade tip, said line-of-sight being defined by alignment of said telescope and said second target, said selected position of said telescope and said offset of said second target being selected to achieve a predetermined lead-lag angle of said blade when said first target lies on said line-of-sight, whereby said lead-lag angle may be accurately and repeatably adjusted in a static test from a measurement taken from said blade tip.

* * * * *